Aug. 11, 1942.                    C. JOHNSON                    2,293,019
                                 GAS ANALYZER
                              Filed Oct. 12, 1938

Inventor
CLARENCE JOHNSON
By Raymond W. Junkins
Attorney

Patented Aug. 11, 1942

2,293,019

UNITED STATES PATENT OFFICE 2,293,019

GAS ANALYZER

Clarence Johnson, Cleveland Heights, Ohio, assignor to Bailey Meter Company, a corporation of Delaware Application October 12, 1938, Serial No. 234,667

7 Claims. (Cl. 23—255)

My invention relates to a means for measuring or determining the intensity of a chemical reaction, and thus to indicate the concentration of one of the reacting constituents. Further, my invention has the particular application of indicating the proportion of a gas present in a mixture of gases.

It is an object of my invention to provide a simple, reliable and accurate instrument which will measure and indicate readily and quickly the proportion of free oxygen present in the gaseous products of combustion.

Another object is to provide for a continuous indication of the concentration of a reactive substance in a gaseous mixture.

Still another object is to provide an inexpensive apparatus that is easily applied to the purposes specified.

In practicing my invention I provide a simple electric circuit of low voltage which has in its path a catalyst and is for the purpose of heating the catalyst. The catalyst may be of any metal capable of aiding the reaction of a gaseous mixture of methanol vapor and oxygen in flue gases, such as nickel, copper, bronze, Monel. I have chosen Monel metal, although any of the mentioned metals and probably others may also be used.

A gaseous mixture of methanol vapor and flue gas is passed through a minutely perforated tube within the catalytic tube. The reaction takes place on the inside of the catalytic tube and over its entire effective length. The heat of the reaction causes the catalytic tube to expand in proportion to the amount of oxygen in the gaseous mixture. Such expansion is directly calibrated to read in terms of quantity of oxygen.

The apparatus is direct acting and is extremely simple. No delicate electrical reading and recording instruments are necessary. Its underlying principle is simply that of expansion and contraction. It is sensitive to small quantities of free oxygen as well as large.

It will be noticed that the method of control of the gaseous mixture, the feeding of methyl alcohol and flue gas is similar to that described in a co-pending application of mine Serial No. 234,668 filed of even date herewith and as will be explained again hereinafter. Once the reaction is started it becomes exothermic, providing that enough oxygen is always present. Now, flue gases very seldom carry a great excess of oxygen and at times none at all or a very small amount. In such instance the reaction would stop. To prevent its failure I maintain the catalytic tube at a minimum temperature by heating it with a low voltage current.

Figure 2:
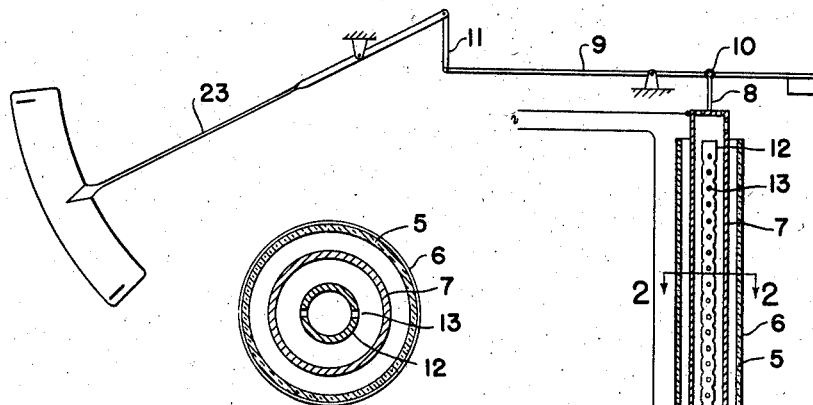
Figure 1:
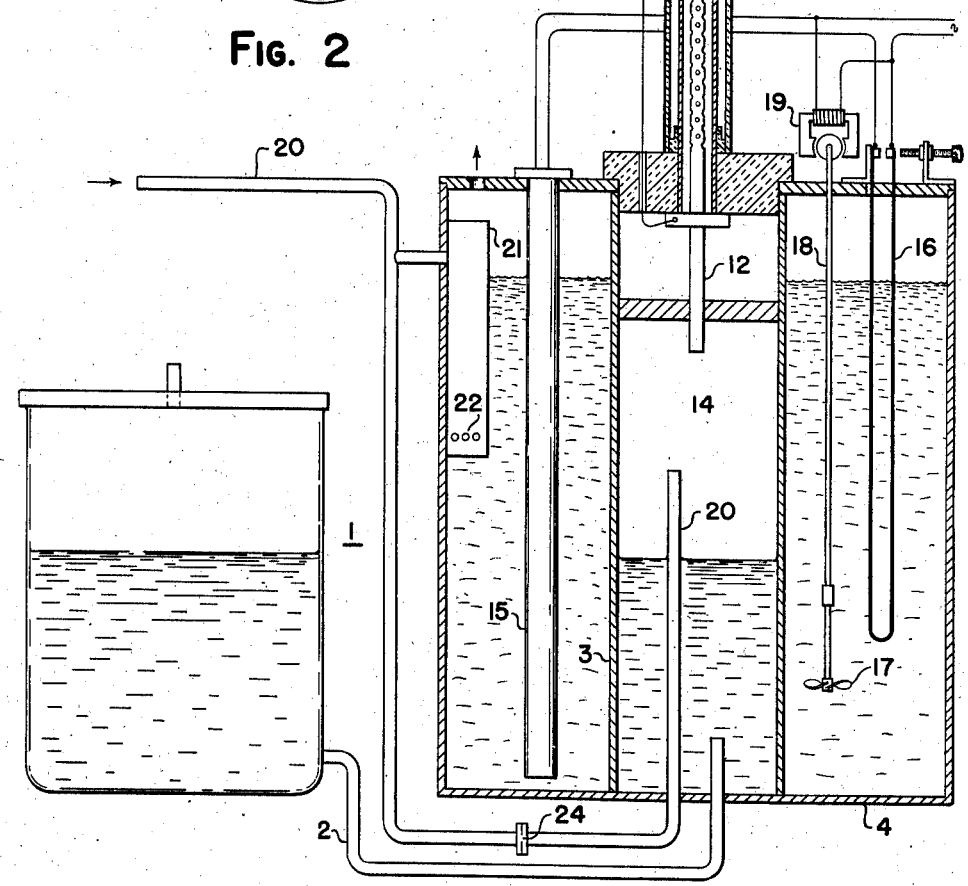

In the accompanying drawing Fig. 1 is a diagrammatic and sectional view of the entire apparatus, and Fig. 2 is a cross section of the reaction chamber taken through 2—2.

Referring to Fig. 1, I show therein a supply of methyl alcohol in container 1. This container is connected by pipe 2 to a central vertical cylinder 3 in the cabinet 4, where a certain desired depth of the methyl alcohol is maintained; such depth can be readily so held by any practiced methods.

For convenience, above the methyl alcohol in the cabinet 4 and on top of it, is located a vertical tube 5 of inert material which may be of Pyrex glass or otherwise, and covered by any desired insulation 6. Within the tube 5 and concentric to it is the Monel metal catalytic tube 7. To the top of this tube is attached a link 8 desirably connecting arm 9 at pivot 10 and, which at one end has pivotally connected a link 11 and a recording pen 23. This linkage is adjusted and calibrated so as to give a direct reading of the oxygen content of the gas to be tested.

Concentric to the Monel metal tube and rising from within the gas mixture chamber 14 to substantially the same height, is a stainless steel tube 12 perforated with minute apertures 13. The gaseous mixture rising from the mixing chamber 14 flows through this diffusing tube 12 which so regulates the gaseous flow as to cover at a uniform rate of flow all the inside effective area of the catalyst.

The methyl alcohol flows through pipe 2 into the centrally located cylinder 3 within the cabinet 4. The amount of evaporation of methanol vapor is a function of surface area and temperature. The temperature of the alcohol is closely controlled by heating a liquid, such as dibutyl phthalate having a low vapor pressure, by means of an electric heating element 15 which may be of any type desired. Temperature control is had by a bimetal thermostat 16 inserted in the liquid. To secure uniformity of temperature throughout the cabinet I stir the liquid (which substantially surrounds the pool of methyl alcohol) continuously by an agitator which consists of a small propeller blade 17 mounted on a shaft 18 turned by the electric motor 19.

A definite mixture of methanol vapor and flue gases is attained by controlling the flow of flue gas into the mixing chamber. Flow control of the flue gas may be had in one of the many ways that are at present practiced. For example, the flue gas is supplied to the pipe 20 by means of a pump at a pressure sufficiently high to insure a constant flow through a small orifice 24. The flue gas is brought into the mixing chamber either by allowing it is flow through the alcohol or to come in just above it through pipe 20. The flue gas excess goes into chamber 21 and bubbles out through orifices 22, thence through the liquid into the atmosphere. The mixture of both the flue gas and methanol vapor rises into tube 12, and is diffused through apertures 13 on the inner wall of the catalytic tube 7 where it is burned. The arrangement is so illustrated for simplicity's sake. It may conveniently be otherwise.

Fig. 2 shows the concentric relationship of the various tubing. The gaseous mixture filters through the apertures 13 of centrally located tube 12 toward the catalyst tube 7 where the reaction takes place. Surrounding the catalytic tube 7 and concentric to it is an insulated tube 5 of inert material such as Pyrex glass.

The expansion of tube 7 provides considerable available power so that I may readily actuate a fluid pressure pilot valve directly thereby to effect a control in accordance with determined oxygen content of the gases being tested. For example, if I am determining the oxygen content of the gaseous products of combustion, I may use the determination to control the supply of fuel and/or air for combustion to maintain the oxygen content of the products of combustion at desired value.

While I have set forth a description of my apparatus and its particular application to the detection and measurement of oxygen in a gaseous mixture, it is apparent that many modifications may occur to those skilled in the art, within the spirit and scope of my invention.

What I claim as new, and desire to secure by Letters Patent of the United States is:

1. A gas analyzer comprising a tubular reaction cell of catalytic material, heating means for said tube, a mixing chamber, a gas feeding and spreading means within and concentric with said cell and connecting with said mixing chamber, a container for a volatile combustible liquid, a conduit connecting said container and said mixing chamber, an inlet for said test gas to said mixing chamber, heating mean for vaporizing said liquid in said chamber, temperature control means associated with said heating means, and indicating means connected to and responsive to any variation in length of said cell when gas is burned therein.

2. Apparatus for indicating the presence and amount of oxygen in a gaseous mixture, comprising a heated catalytic tube rigidly fixed at one end, a shrouding heat insulator positioned about said tube, means extending within said tube for feeding and evenly diffusing said gaseous mixture about the interior of said tube, and means connected to the free end of the tube and responsive to change in length thereof for indicating the amount of oxygn in the gaseous mixture through variation in length of the tube caused by the heat of combustion of the gaseous mixture.

3. In an instrument for detecting a reactive constituent gas of a gaseous mixture by burning the mixture on a catalyst, a heated tubular catalyst detector member whose surface is large as compared with its cross section, said member having one end fixed and the other end free to move as a result of thermal expansion whereby such movement is an indication of the extent of such expansion, of the member when gas is burned therein, a perforated tube concentric within the detector member and communicating at one end with the supply source of the gasous mixture to be tested, an insulating shielding tube of inert material surrounding the detector member, means for heating the detector member, and means for establishing a flow of gaseous mixture to be tested from the said source to the perforated tube within the detector member.

4. In an instrument for the detection of a constituent gas in a gaseous mixture, a first perforated tube traversed by said mixture and means for supplying the mixture thereto, a heated catalytic tube surrounding said first tube and adapted to effect a reaction of reactive constituents of said gaseous mixture, and indicating means connected to and responsive to changes in length of the catalytic tube when the gas is burned therein.

5. A gas analyzer including a tubular catalyst defining a reaction cell, heating means for the catalyst, a mixing chamber, gas feeding and spreading means centered within and substantially coextensive in length with the catalyst and connecting with said mixing chamber, a container for a volatile combustible liquid having fluid connection with said mixing chamber, said mixing chamber being provided also with an inlet for the test gas, temperature control means constructed and arranged for vaporizing said combustible liquid at a substantially uniform rate, and indicating means constructed and arranged to respond to variations in length of the catalyst when a mixture of said vaporized liquid and test gas are burned thereon.

6. A gas analyzer for quantatively determining the amount of free oxygen in a flowing gaseous mixture, including in combination, a tubular catalyst rigidly fixed at one end and defining a reaction cell, heating means for the catalyst, a mixing chamber, gas feeding and spreading means within and concentric to said catalyst and connecting with said mixing chamber, a container for a volatile combustible liquid having fluid connection with said mixing chamber, said mixing chamber being provided also with an inlet for the test gas, temperature control means for said combustible liquid, and indicating means constructed and arranged to respond to variations in length of the tubular catalyst when the gaseous mixture is burned thereon.

7. Apparatus for determining the percentage of free oxygen in a flowing gaseous mixture, including in combination, a tubular catalyst rigidly held at one end and adapted to visually indicate change in length by the free movement of its other end, heating means for the catalyst, means extending within the catalyst for uniformly diffusing the flowing mixture upon the interior of the tubular catalyst, and means connected respectively to a source of the gaseous mixture and a source of a volatile combustible fuel for supplying said gaseous mixture and fuel to the diffusing means at relatively uniform rate and proportion.

CLARENCE JOHNSON.